(12) United States Patent
Pfeiffer et al.

(10) Patent No.: US 11,982,300 B2
(45) Date of Patent: May 14, 2024

(54) FASTENING DEVICE

(71) Applicant: ILLINOIS TOOL WORKS INC., Glenview, IL (US)

(72) Inventors: Christian Pfeiffer, Enkenbach (DE); Thiemo Ammann, Rockenhausen (DE); Roland Classen, Roetgen (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 228 days.

(21) Appl. No.: 17/505,225

(22) Filed: Oct. 19, 2021

(65) Prior Publication Data
US 2022/0136550 A1 May 5, 2022

(30) Foreign Application Priority Data

Oct. 30, 2020 (DE) .................. 10 2020 128 594.9
Sep. 10, 2021 (DE) .................. 10 2021 123 552.9

(51) Int. Cl.
*F16B 13/06* (2006.01)
*F16B 19/10* (2006.01)
*F16B 19/00* (2006.01)

(52) U.S. Cl.
CPC ........ *F16B 19/1081* (2013.01); *F16B 19/008* (2013.01)

(58) Field of Classification Search
CPC ........................... F16B 19/008; F16B 19/0081
USPC ................................................ 411/508, 509
See application file for complete search history.

(56) References Cited

U.S. PATENT DOCUMENTS

| | | | | |
|---|---|---|---|---|
| 3,810,279 A | * | 5/1974 | Swick | F16B 21/084 411/509 |
| 4,424,612 A | | 1/1984 | Muller | |
| 5,306,098 A | * | 4/1994 | Lewis | F16B 19/004 411/510 |
| 5,706,559 A | * | 1/1998 | Oliver | F16B 21/088 24/453 |
| 5,907,891 A | * | 6/1999 | Meyer | F16B 19/004 24/297 |

(Continued)

FOREIGN PATENT DOCUMENTS

| | | |
|---|---|---|
| DE | 8013284 U1 | 10/1980 |
| DE | 3535210 A1 | 4/1987 |

(Continued)

*Primary Examiner* — Gary W Estremsky
(74) *Attorney, Agent, or Firm* — THOMPSON HINE LLP

(57) ABSTRACT

A fastening apparatus includes a head element for abutting a first edge region of a component opening and an anchor foot element for rear engagement with a second edge region lying opposite the first edge region. The anchor foot element has a base section extending from the head element in axial direction and four locking arms arranged in pairs and connected to the base section. Each pair of locking arms is configured in order to be pivotable relative to an axial central plane of the fastening apparatus, and each pair of locking arms has locking/centering stages arranged offset from one another in axial direction. A locking/centering stage comprises a centering surface for centering the fastening apparatus relative to a component opening and a locking surface for rear engagement with a component opening. A locking surface and a centering surface of a locking/centering stage are arranged approximately orthogonally to one another.

16 Claims, 4 Drawing Sheets

(56) References Cited

U.S. PATENT DOCUMENTS

| | | | |
|---|---|---|---|
| 6,406,236 B1* | 6/2002 | Olson, Jr. | F16B 37/043 470/25 |
| 7,503,528 B2* | 3/2009 | Adams | F16L 3/137 24/297 |
| 8,177,179 B2* | 5/2012 | Bard | G01K 1/14 248/222.12 |
| 8,601,649 B2* | 12/2013 | Klein | F16B 21/084 24/297 |
| 8,627,533 B2* | 1/2014 | Pichon | E04H 4/1654 210/167.16 |
| 9,828,151 B2* | 11/2017 | Aoyama | F16B 21/086 |
| 10,462,910 B2* | 10/2019 | Brodbeck | H05K 1/14 |
| 10,830,270 B2* | 11/2020 | Lepper | F16B 21/086 |
| 2005/0260060 A1* | 11/2005 | Zoubek | F16B 21/086 411/508 |
| 2007/0272807 A1 | 11/2007 | Takagaki | |
| 2012/0155985 A1* | 6/2012 | Ruckel | F16B 37/043 411/301 |
| 2012/0217355 A1* | 8/2012 | Geiger | F16L 3/2332 248/65 |
| 2013/0119205 A1* | 5/2013 | Emoto | B61L 15/009 246/191 |

FOREIGN PATENT DOCUMENTS

| | | |
|---|---|---|
| DE | 10304031 A1 | 8/2004 |
| DE | 69633469 T2 | 11/2005 |
| DE | 102010048690 | 6/2011 |
| FR | 2938310 B1 | 5/2010 |
| JP | 4299471 B2 | 7/2009 |
| JP | 4936802 B2 | 5/2012 |
| JP | 5917244 B2 | 5/2016 |
| WO | WO 2017144570 A1 | 8/2017 |

\* cited by examiner

FASTENING DEVICE

TECHNICAL FIELD

The present invention relates to a fastening apparatus.

BACKGROUND

In order to fasten components, in particular vehicle components, to corresponding carrier components, fastening anchors or fastening apparatuses are known. Line retainers or other functional elements can also be integrally formed on the fastening anchors or fastening apparatuses themselves in order to fasten the former to a component carrier Such fastening anchors have an anchor foot for rear engagement with corresponding component openings in carrier components. Here, there are anchor feet that have multi-stage locking elements and are thus suitable for different thicknesses of carrier components. There are also anchor feet that allow for accurate positioning of the fastening anchor.

From WO 2017 144 570 A1, a fastening plug for fastening an add-on part to a carrier element, in particular a body of a motor vehicle, is known, with a plug element having an insertion tip that is insertable into a fastening opening of the carrier element and a retaining head that is assignable to the add-on part, which are fixedly connected to one another by a shaft, as well as at least one at least radially displaceable locking element for rear engagement with the carrier element in the state of having been inserted into the fastening opening, and with an elastically deformable sealing sleeve, which is retained on the plug element and has at least one radially projecting sealing lip for abutment between the retaining head and the carrier element. Further, the invention relates to an add-on assembly having an add-on part and a fastening element disposed thereon, as well as a fastening assembly having an add-on part, a carrier element of a body of a motor vehicle, and a fastening plug.

Further fastening plugs are also known from DE 10 2010 048 690 as well as from DE 80 13 284 U1 and DE 103 04 031 A1, for example.

SUMMARY

The problem addressed by the present invention is to provide a flexibly insertable fastening apparatus that is safe and reliable in operation.

A further problem addressed by the present invention is to provide a fastening apparatus that ensures sufficient retaining force.

In addition, a problem addressed by the present invention is to provide a fastening apparatus that can be arranged with positional accuracy relative to a carrier component.

One or more of these problems are addressed by the features of the independent claim 1. Advantageous configurations are specified in the respective dependent subclaims.

According to the present invention, a fastening apparatus is provided. Said apparatus comprises a head element for abutting a first edge region of a component opening and an anchor foot element for rear engagement with a second edge region of a component opening lying opposite the first edge region, wherein the anchor foot element has a base section extending from the head element in axial direction and four locking arms connected to the base section, wherein adjacent locking arms have locking/centering stages arranged offset from one another in axial direction, wherein a locking/centering stage comprises a centering surface for centering the fastening apparatus relative to a component opening and a locking surface for rear engagement with a component opening, wherein a locking surface and a centering surface of a locking/centering stage are arranged approximately orthogonally to one another.

The fastening apparatus according to the invention thus has four locking arms, wherein the locking arms of one pair each have locking/centering stages that are offset in axial direction from one another, so that the fastening apparatus according to the invention is suitable for component openings with different diameters as well as for components or carrier components having different thicknesses. Such a thickness can be, for example, between 0.6 mm and 7 mm.

In particular, it can be provided that adjacent locking arms are respectively connected to the base section while offset from one another in axial direction and/or hinged to the base section such that the corresponding locking/centering stages are arranged offset from one another in axial direction. Here, the locking arms can then preferably be similarly configured.

By providing radially circumferential locking/centering stages on each locking arm, each having a centering surface, wherein the centering surfaces are preferably arranged approximately radially circumferentially and extend approximately in axial direction in an assembled position, the fastening apparatus according to the invention is adaptable to different diameters of component openings. Nevertheless, a predetermined fastening point or a predetermined fastening position is always achieved, so that elements, such as line holders, which are integral with the fastening apparatus or components, such as cover components or seal elements, are always positionable in exactly the same location.

An assembled position in the context of the present invention is understood to mean a position in which the fastening apparatus is connected in a passage opening of a carrier component and the locking/centering stages engage rearwardly with an edge that limits the passage opening of the carrier component.

In addition, the radially circumferential locking/centering stages also have locking surfaces for rear engagement with a component opening, said locking surfaces preferably extending in an assembled position approximately transverse to the axial direction and being arranged radially circumferentially. In that the locking surfaces are offset from one another in axial direction, the fastening apparatus can be securely and reliably fastened to carrier components of varying thicknesses.

The centering surfaces can be approximately convex in form transverse to the axial direction or in cross-section. Due to the fact that the centering surfaces are approximately convex in form transverse to the axial direction and are arranged to be approximately radially circumferential, their geometry assists in centering and positioning the fastening apparatus in a component opening of a component, so that a predetermined fastening position of the fastening apparatus is always ensured relative to the component.

Due to the locking/centering stages of the four locking arms, it is thus ensured that the fastening apparatus is centrally arranged in a passage opening of a carrier component.

The four locking arms can be arranged in pairs, wherein each pair of locking arms is configured in order to be pivotable relative to an axial central plane of the fastening apparatus.

In that the four locking arms are arranged in pairs, wherein each pair of locking arms is pivotally formed with respect to an axial central plane of the fastening apparatus, such a fastening apparatus can be easily deformed when manufactured by an injection molding process.

Each locking arm can have between two and five locking stages, and preferably three locking stages.

By providing a plurality of locking stages for each locking arm that are offset from one another in axial direction, it is possible to arrange the fastening apparatus securely and reliably with component openings of components of different thicknesses, because a suitable locking surface is almost always available for the rearward engagement of a component opening.

A locking surface can be inclined relative to the central plane at a predetermined angle $\alpha$, wherein the locking surfaces of a locking arm are inclined orthogonally to the central plane or to the axial direction, preferably at different angles $\alpha 1$, $\alpha 2$, $\alpha n$, and wherein $\alpha$ is preferably an acute angle less than 90°; or less than 75°, or less than 60°, or less than 45, or less than 30°, or less than 20°, or less than 15, and at least greater than 3°, or greater than 5°, or greater than 10°. The different angles result from the angle at which a locking arm is hinged towards the anchor foot element in order to allow for a full-surface abutment of the locking surface, to the extent possible.

The arrangement of the locking surfaces opposite the central plane at a predetermined angle ensures that the locking surfaces securely abut an edge of a component opening, in particular in the assembled position approximately parallel to a surface of the carrier component, and rearwardly engage with the carrier component. Such a linear load means that high pull-in and/or push-on forces of the fastening apparatus with respect to the component are possible, as is a correspondingly high pull-off force.

In the optimal case, the locking surfaces rest substantially flat against a surface of a component adjacent to the component opening. Such a flat load allows for even greater retaining or pull-off forces due to the positive lock.

Further, a centering surface can be inclined relative to the central plane or the axial direction at a predetermined angle $\beta$, wherein the centering surfaces of a locking arm are inclined relative to the center axis, preferably at different angles $\beta 1$, $\beta 2$, $\beta n$, and wherein $\beta$ is an acute angle less than 90°; or less than 75°, or less than 60°, or less than 45, or less than 30°, or less than 20°, or less than 15 and at least greater than 3°, or greater than 5°, or greater than 10°. The different angles result from the angle at which a locking arm is hinged towards the anchor foot element in order to allow a full-surface abutment of the centering surface on a sheath wall of a passage opening of a carrier component, to the extent possible.

Additionally, each pair of locking arms can be configured in order to be pivotable parallel to one another relative to the axial central plane of the fastening apparatus.

The locking arms of a pair are arranged offset from one another in axial direction.

Due to the fact that the locking arms of a pair are arranged offset from one another in axial direction, at least five and preferably even six locking/centering stages are available in the case of three locking stages per locking arm, provided the locking arms are approximately uniform. The fastening apparatus according to the invention is thus even more flexible and adaptable to different thicknesses of components and different diameters of component openings.

Diametrically opposed locking arms can be arranged at approximately the same height in axial direction. The respective locking/centering stages of diametrically opposed locking arms, and thus their respective locking surfaces and centering surfaces, are arranged in the same axial direction at the same position and/or height. This allows for safe and reliable centering and fastening of the fastening apparatus so that a sufficiently large retaining force and a predetermined fastening position is always achieved.

The locking arms are designed in a circular segment form in cross-section. The circular segment configuration of the locking arms makes the insertion and centering of the fastening apparatus in a component opening of a component significantly easier.

The head element can have a sealing element for sealing abutment on a component opening, or the head element can be configured as a sealing element. Such a sealing element has at least one and preferably two sealing elements arranged concentrically to one another.

Thus, such a fastening arrangement also meets the highest sealing requirements. This means that the fastening apparatus can also be used in places where seals must be fixed or a sealing fastening is required. Corrosion of the carrier component is also avoided, as there is no longer any protective layer or varnish due to the formation of a corresponding passage opening.

At a free end of the anchor foot, axially extending and rounded centering ribs can be provided, which form an insertion and/or centering aid of the fastening apparatus With the assistance of the axially extending and rounded centering ribs, the centering of the fastening apparatus in a component opening is supported so that a predetermined fastening position can be achieved. In addition, the rounded centering ribs facilitate insertion into a component opening.

Two adjacent locking arms can be formed together in cross-section in a circular segment in the region of the locking/centering stages. This means that each catch arm has at least half the circular segment in the region of the locking/centering stage in cross section.

The fastening apparatus is preferably made from plastic by means of a single-component injection molding process.

Insofar as the sealing element is provided, the fastening apparatus is also manufactured from two different plastics by means of a two-component injection molding process.

Furthermore, according to the present invention, an add-on assembly, with an add-on part to be fastened to a carrier component and a fastening apparatus arranged thereon or attached thereto or integrally connected thereto, is provided.

In addition, according to the present invention, a fastening arrangement, with an add-on assembly and a carrier element or a body of a motor vehicle, is provided.

According to the present invention, the head element for abutting a first edge region of a component opening can also be an integral part of a component or add-on part to be fastened to a carrier component.

Such an integral connection can be produced, for example, by means of an additive or generative manufacturing process (3D printing).

BRIEF DESCRIPTION OF THE DRAWINGS

The present invention will be described in more detail in the following on the basis of an exemplary embodiment shown in the figures. The figures show.

DETAILED DESCRIPTION

Figure 1:
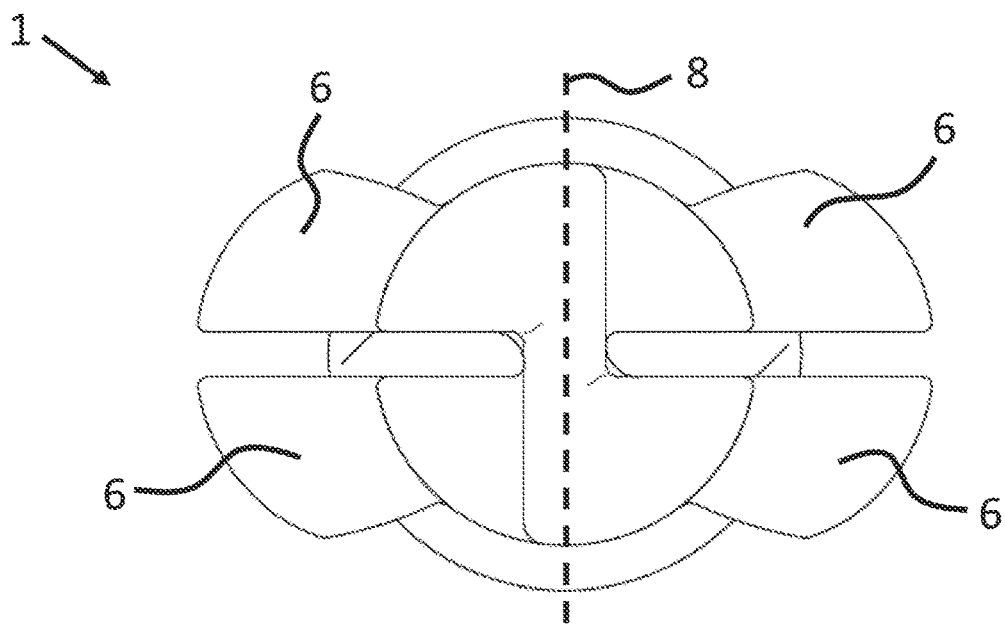
FIG. 1 is a perspective view of a fastening apparatus according to the invention in a home position according to a first exemplary embodiment.
Figure 2:
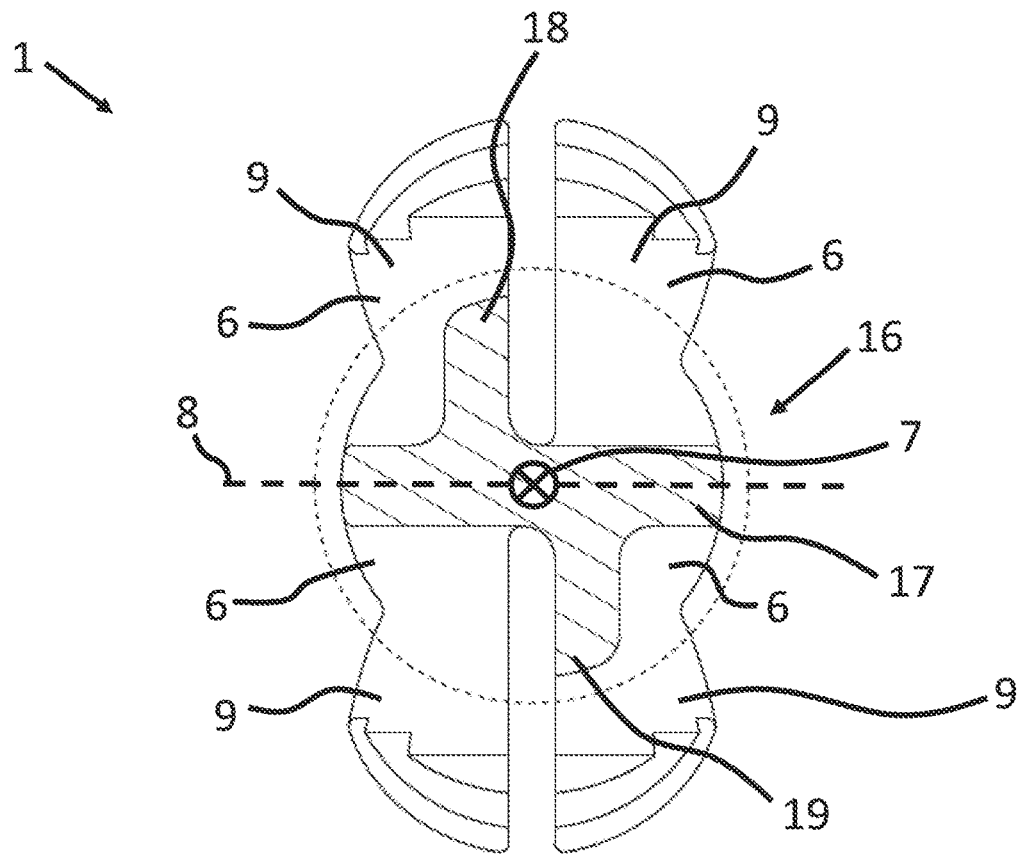
FIG. 2 is a side-cut view of the fastening apparatus in a top plan view.
Figure 3:
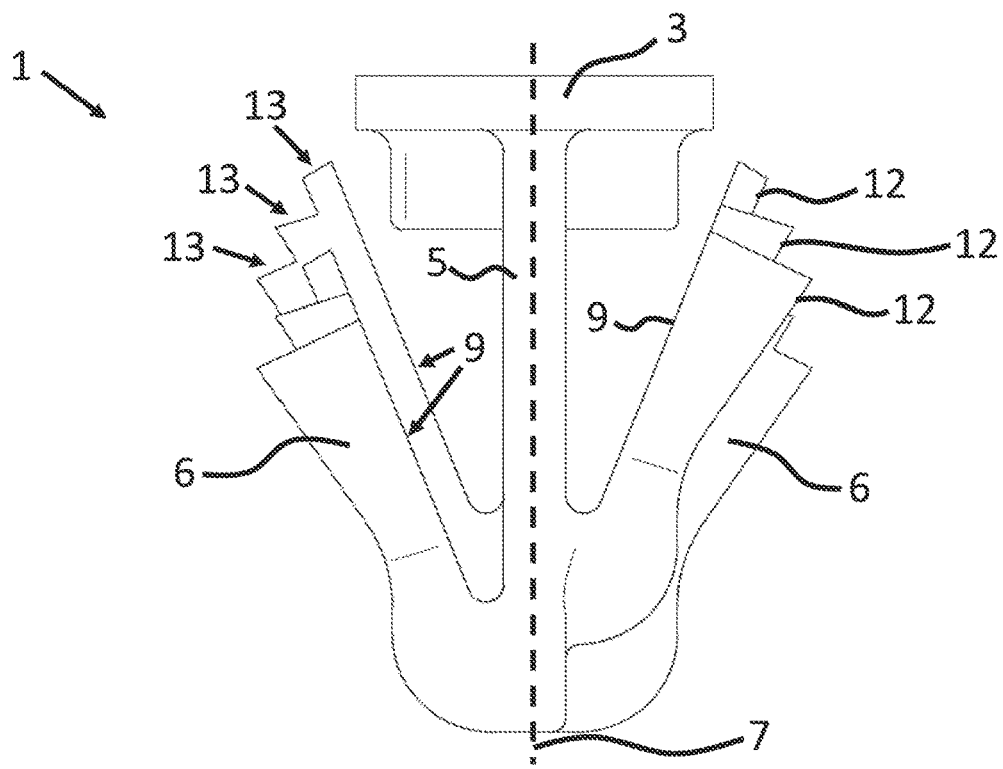
FIG. 3 is a side view of the fastening apparatus according to the invention.
Figure 4:
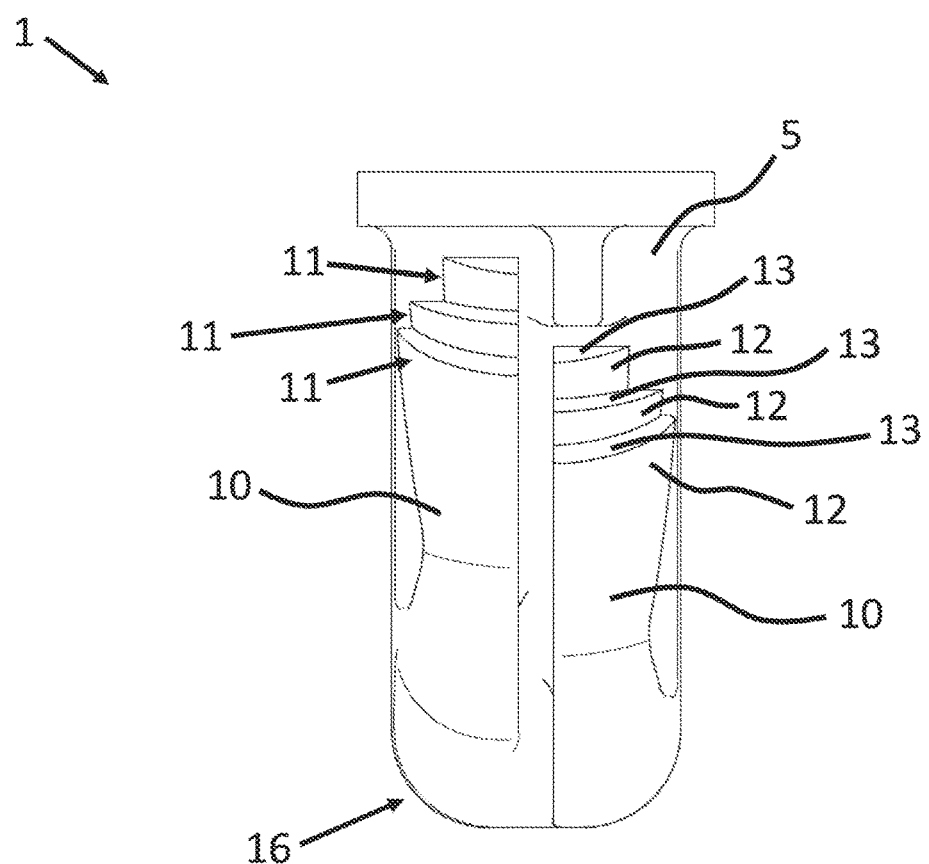
FIG. 4 is a further side view of the fastening apparatus according to the invention.
Figure 5:
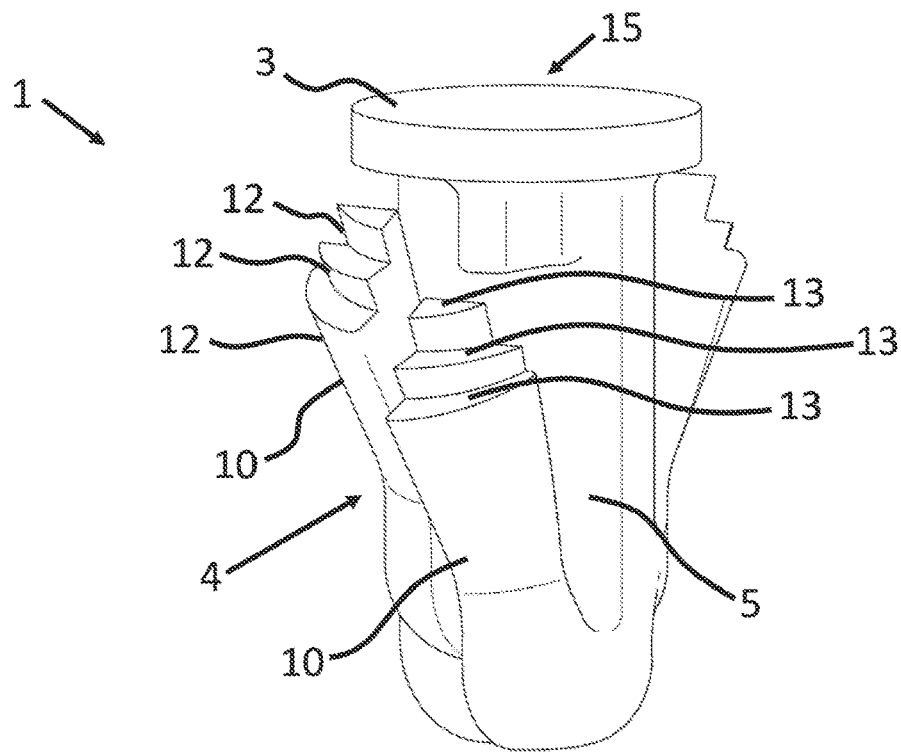
FIG. 5 is a further perspective view of the fastening apparatus according to the invention.
Figure 6:
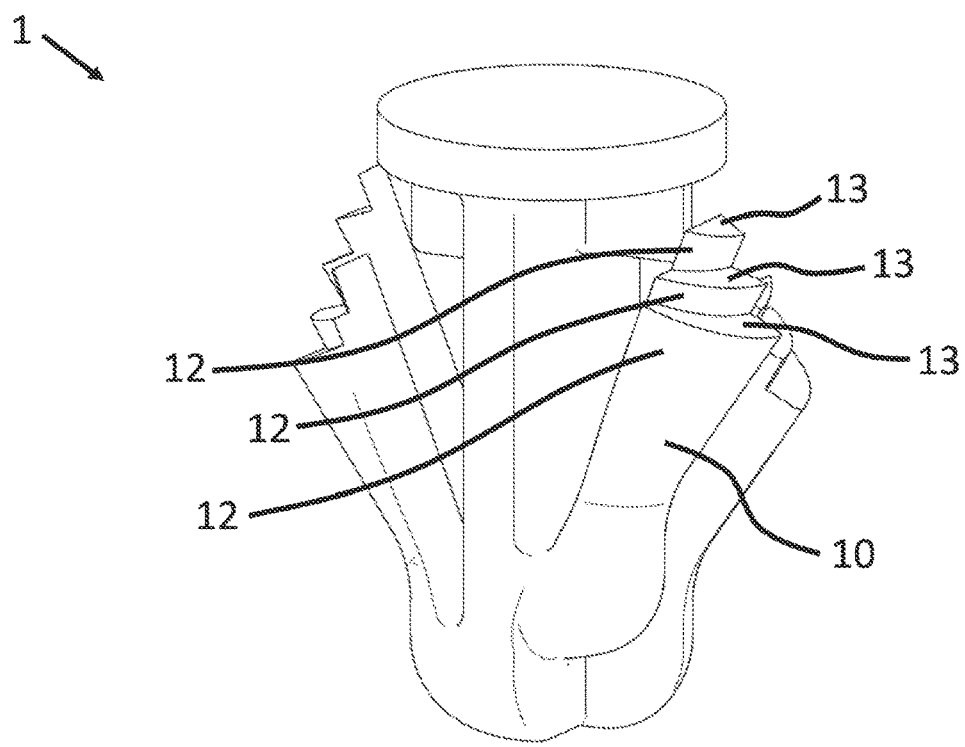
FIG. 6 is a further perspective view of the fastening apparatus according to the invention.

A fastening apparatus 1 according to the invention is configured in order to be inserted into a component opening of a carrier component in the assembly direction 2. The fastening apparatus comprises a head element 3 and an anchor foot element 4.

The head element (3) is configured to abut a first edge region of a component opening. The first edge region faces opposite an axial direction 7 and a assembly direction 2, respectively.

In the context of the present invention, an assembly direction 2 is understood to mean a direction that extends orthogonally to a surface of a carrier component that limits a passage opening.

The head element 3 can be configured as desired. It can be configured in a disk-shaped fashion, for example.

On the head element 3, fastening or retaining devices (not shown) can be integrally formed for the fastening of components or line retainers (not shown) or components (not shown), in particular add-on parts.

The anchor foot element 4 is configured in order to engage with a second edge region of a component opening lying opposite the first edge region. The second edge region accordingly faces opposite the assembly direction 2 and extends orthogonally to said direction The anchor foot element 4 has a base section 5 extending from the head element 3 in axial direction 7 and four locking arms 6 arranged in pairs and connected to the base section. The base section 5 is approximately plate-shaped and extends along a central plane 8 of the fastening apparatus 1.

The locking arms 6 are each arranged in pairs, wherein two locking arms 6 of a pair of locking arms are arranged offset from one another in axial direction 7 and in assembly direction 2, respectively. The offset is preferably achieved in that the locking arms 6 are integrally formed pivotably at different regions on the plate-shaped base section 5 that are arranged offset to one another in axial direction 7 and in assembly direction 2. The locking arms 6 are thus pivotally configured transversely to the central plane.

The locking arms 6 thus have two base walls 9 running parallel to the central plane 8. In addition, the locking arms 6 have a centering wall 10 that faces radially outward and is configured as a circular segment in cross-section.

Two diametrically opposed locking arms 6 are arranged at approximately the same height in axial direction 7.

At the free ends of the locking arms 6, locking/centering stages 11 are arranged above one another in axial direction 7. Each locking arm 6 can be associated with approximately two to five locking/centering stages 11. In the present exemplary embodiment, three locking/centering stages 11 are arranged in axial direction 7 above one another or offset from one another.

Each locking/centering stage 11 comprises a centering surface 12 for centering the fastening apparatus 1 with respect to a component opening and a locking surface 13 for rear engagement with a component opening.

The locking surfaces 13 are inclined orthogonally to the central plane 8 at a predetermined angle $\alpha$. The locking surfaces 13, which are arranged offset in axial direction above one another, are preferably inclined opposite the central plane in different angles $\alpha 1$, $\alpha 2$, $\alpha 3$.

Alternatively, the locking surfaces 13 can be inclined opposite to the axial direction or a central axis, preferably at different angles $\alpha 1$, $\alpha 2$, $\alpha 3$.

The angle $\alpha$ is an acute angle of less than 90°; or less than 75°, or less than 60°, or less than 45°, or less than 30°, or less than 20°, or less than 15°, and at least greater than 3°, or greater than 5°, or greater than 10°.

The locking surfaces 13 of a diametrically opposed locking arm 6 have an analogous inclination angle opposite the central plane 8.

The locking surfaces 13 extend in an assembled position 20 approximately orthogonally to the axial direction 7. In a home position 15, the locking surfaces 13 are inclined at a flat angle relative to the axial direction.

The centering surfaces 12 are arranged approximately orthogonally to the locking surfaces 13.

The centering surfaces 12 are preferably inclined opposite the axial direction 7 or the central axis at a predetermined angle $\beta$, wherein the centering surfaces 12 of a locking arm are preferably inclined opposite the central axis at different angles $\beta 1$, $\beta 2$, $\beta 3$.

Alternatively, the centering surfaces 12 can be inclined relative to the central plane 8, preferably at different angles $\beta 1$, $\beta 2$, $\beta 3$.

The angle $\beta$ is an acute angle of less than 90°; or less than 75°, or less than 60°, or less than 45°, or less than 30°, or less than 20°, or less than 15°, and at least greater than 3°, or greater than 5°, or greater than 10°.

In the assembled position 20 and also during insertion, when a corresponding centering surface 12 makes contact with an edge of a component opening, the centering surfaces 12 extend approximately in axial direction 7.

In the home position 15, the centering surfaces 12 are inclined at an acute angle opposite a central axis 14.

On the base section 5, centering ribs 16 that extend in axial direction 7 and are rounded in radial direction are provided at a free end or on an end of the fastening apparatus 1 that is frontward in assembly direction 2. The centering ribs 16 form an insertion and/or centering aid of the fastening apparatus 1.

It is provided here, in particular, that the end of the base section 5 that is frontward in assembly direction 2 forms a first centering rib 17. In addition, a second and a third centering rib 18, 19 can be provided, which extend transversely to the first centering rib 17.

Two adjacent locking arms can be formed together in cross-section in a circular segment in the region of the locking/centering stages. This means that each locking arm has the shape of a half-circle segment in cross-section at least in the region of the locking/centering stage.

The two further exemplary embodiments have the same technical features as the fastening apparatus according to the first exemplary embodiment, unless otherwise stated. The technical features of the exemplary embodiments can be combined as desired with one another, insofar as technically sensible.

Figure 7:
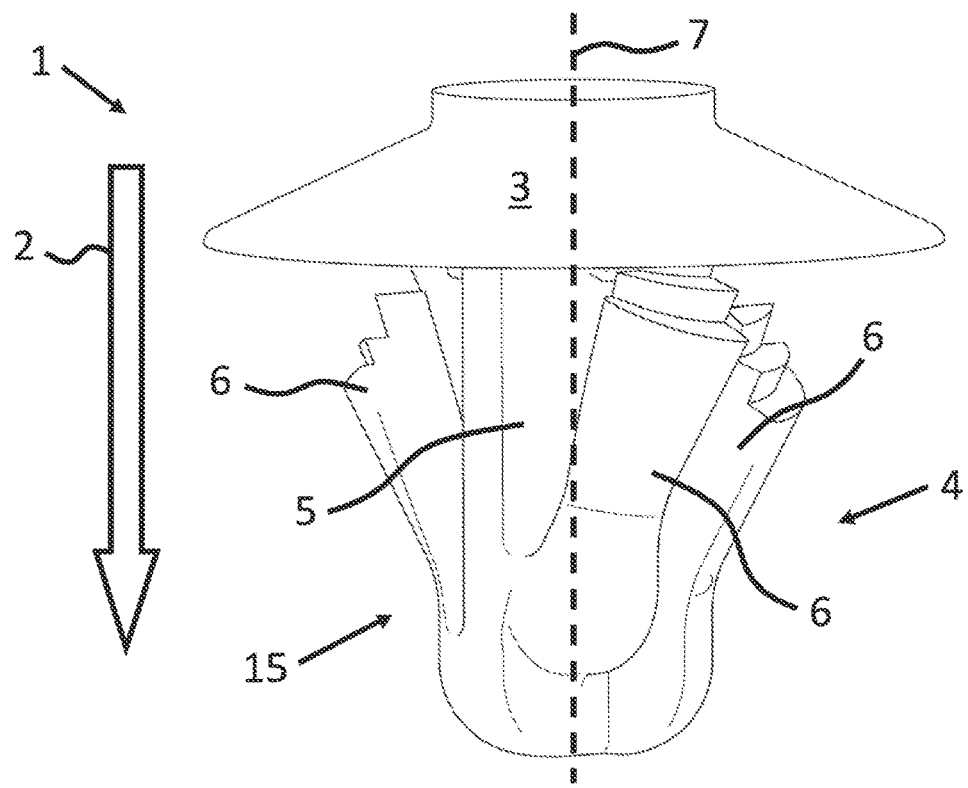
FIG. 7 is a perspective view of the fastening apparatus according to the invention according to a second exemplary embodiment.

According to a second exemplary embodiment of the fastening apparatus according to the invention (FIG. 7), the head element 3 flares conically in assembly direction 7, in particular in the manner of a disk spring, in order to apply a pre-load on the fastening apparatus. A disk spring takes the form of a flat truncated cone.

Figure 8:
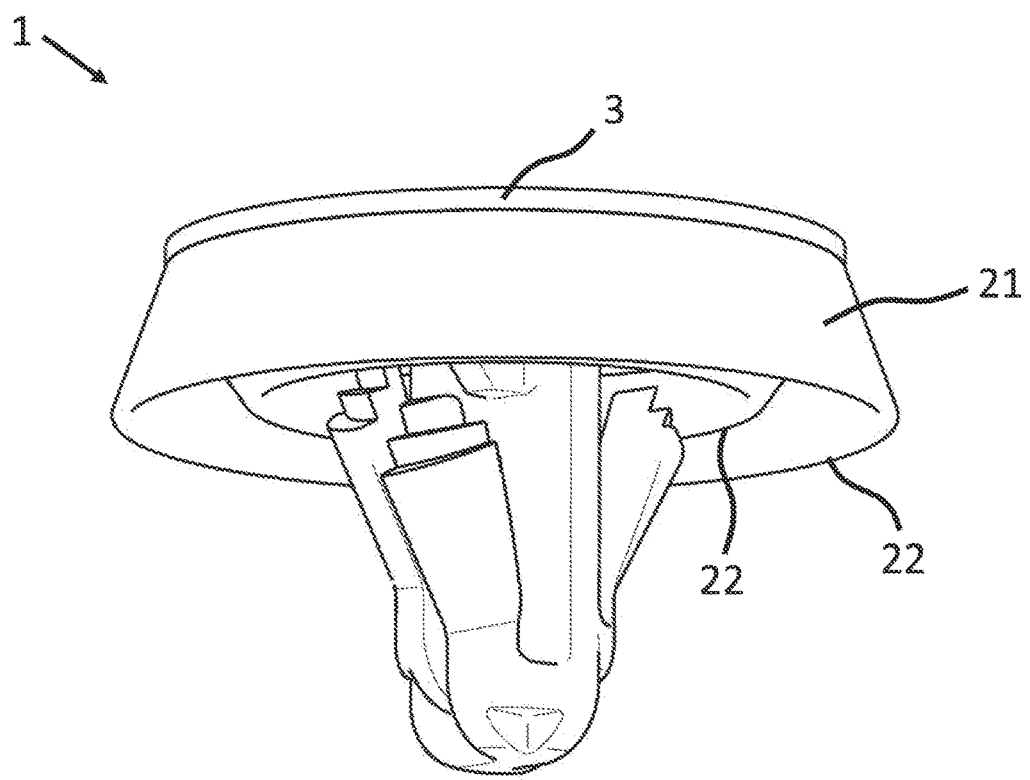
FIG. 8 is a perspective view of the fastening apparatus according to the invention according to a third exemplary embodiment.

According to a third exemplary embodiment of the fastening apparatus 1 (FIG. 8) according to the invention, the head element has a sealing element 21 facing in assembly direction and configured in order to abut the first edge region of a component opening.

The sealing element has two sealing lips 22 arranged concentrically to one another. Alternatively, a single sealing lip can also be provided.

Alternatively, the head element can also be configured completely as a sealing element.

According to an alternative embodiment, not shown, the fastening apparatus according to the invention can also comprise four or more, for example six, locking arms. Such an embodiment can be provided, for example, for larger hole diameters and/or when higher retaining forces are to be provided. Unless otherwise stated, such an exemplary embodiment has the same technical features as the aforementioned exemplary embodiment.

The fastening apparatus then has five or six or more locking arms arranged radially circumferentially and equally spaced apart from one another. Locking stages of adjacent locking arms are then also arranged offset from one another in axial direction. Locking stages that are diametrically opposed to one another are then arranged in axial direction at the same height, insofar as possible.

The locking arms are then preferably configured pivotably in the direction of the central axis.

The fastening apparatus is made from plastic by means of a single-component injection molding process.

Insofar as the sealing element 21 is provided, the fastening apparatus is also manufactured from two different plastics by means of a two-component injection molding process.

Furthermore, according to the present invention, an add-on assembly (not shown), with an add-on part to be fastened to a carrier component and a fastening apparatus arranged thereon or attached thereto or integrally connected thereto, is provided.

In addition, according to the present invention, a fastening arrangement (not shown), with an add-on assembly and a carrier element or a body of a motor vehicle, is provided.

The head element for abutting a first edge region of a component opening can also be an integral part of a component or add-on part to be fastened to a carrier component.

Such an integral connection can be produced, for example, by means of an additive or generative manufacturing process (3D printing).

LIST OF REFERENCE NUMERALS

1 Fastening apparatus
2 Assembly direction
3 Head element
4 Anchor foot element
5 Base section
6 Locking arm
7 Axial direction
8 Central plane
9 Base wall
10 Centering wall
11 Locking/centering stage
12 Centering surface
13 Locking surface
14 Central axis
15 Home position
16 Centering rib
17 First centering rib
18 Second centering rib
19 Third centering rib
20 Assembled position
21 Sealing element
22 Sealing lip

The invention claimed is:

1. A fastening apparatus, comprising:
a head element for abutting a first edge region of a component opening, and
an anchor foot element for rear engagement with a second edge region of a component opening lying opposite the first edge region, wherein the anchor foot element has a base section extending from the head element in an axial direction and four locking arms connected to the base section, wherein neighboring locking arms have respective locking/centering stages arranged offset from one another in the axial direction, wherein a locking/centering stage comprises a centering surface for centering the fastening apparatus relative to a component opening and a locking surface for rear engagement with a component opening, wherein a locking surface and a centering surface of a locking/centering stage are arranged approximately orthogonally to one another;
wherein the base section comprises a wall member having opposed first and second planar wall surfaces extending from the head element in the axial direction and facing outwardly, wherein an axial central plane of the fastening apparatus runs between the opposed first and second planar wall surfaces and within the wall member.

2. The fastening apparatus according to claim 1, wherein the four locking arms are arranged in pairs, wherein each pair of locking arms is configured in order to be pivotable relative to the axial central plane of the fastening apparatus.

3. The fastening apparatus according to claim 1, herein the centering surfaces are approximately convex in form transverse to the axial direction.

4. The fastening apparatus according to claim 1, wherein each locking arm has between 2 and 5 locking/centering stages.

5. The fastening apparatus according to claim 1, wherein a locking surface is inclined at a predetermined angle α opposite the central plane or the axial direction, wherein the locking surfaces of a locking arm are inclined orthogonally to the central plane or the axial direction, wherein α is an acute angle.

6. The fastening apparatus according to claim 1, wherein a centering surface is inclined at a predetermined angle β opposite a center axis, wherein the centering surfaces of a locking arm are inclined opposite the center axis, wherein β is an acute angle.

7. The fastening apparatus according to claim 1, wherein each pair of locking arms is configured in order to be pivotable parallel to one another relative to the axial central plane of the fastening apparatus.

8. The fastening apparatus according to claim 1, wherein the locking arms of a pair are arranged offset from one another in axial direction.

9. The fastening apparatus according to claim 1, wherein diametrically opposed locking arms are arranged at approximately the same height in the axial direction.

10. The fastening apparatus according to claim 1, wherein the locking arms are designed in an approximately semi-circular segment form in cross-section.

11. The fastening apparatus according to claim 1, wherein each locking arm comprises an inner base wall surface that extends angularly away from one of the first and second planar wall surfaces to define an open space between the inner base wall surface and the one of the first and second planar wall surfaces.

12. A fastening apparatus, comprising
a head element for abutting a first edge region of a component opening, and
an anchor foot element for rear engagement with a second edge region of a component opening lying opposite the first edge region, wherein the anchor foot element has a base section extending from the head element in an axial direction and four locking arms connected to the base section, wherein neighboring locking arms have respective locking/centering stages arranged offset from one another in the axial direction, wherein a locking/centering stage comprises a centering surface for centering the fastening apparatus relative to a component opening and a locking surface for rear engagement with a component opening, wherein a locking surface and a centering surface of a locking/centering stage are arranged approximately orthogonally to one another;
wherein the base section and each locking arm are configured such that an open space is formed between each locking arm and an outwardly facing surface portion of the base section.

13. The fastening apparatus of claim 12, wherein each locking arm extends upwardly and outwardly away from a lower end of the base section, such that a size of each open space increases when moving upwardly along each locking arm.

14. The fastening apparatus of claim 13, wherein the base section comprises a wall member having opposed first and second planar wall surfaces that define the outwardly facing surface portion.

15. A fastening apparatus, comprising
a head element for abutting a first edge region of a component opening, and
an anchor foot element for rear engagement with a second edge region of a component opening lying opposite the first edge region, wherein the anchor foot element has a central base section extending from the head element in an axial direction and in line with and along a central axis of the fastening apparatus, and four locking arms connected to the central base section, wherein neighboring locking arms have respective locking/centering stages arranged offset from one another in the axial direction, wherein a locking/centering stage comprises a centering surface for centering the fastening apparatus relative to a component opening and a locking surface for rear engagement with a component opening, wherein a locking surface and a centering surface of a locking/centering stage are arranged approximately orthogonally to one another.

16. The fastening apparatus of claim 15, wherein the centering surfaces are approximately convex in form transverse to the axial direction.

\* \* \* \* \*